US012756625B2

(12) United States Patent
Parikh

(10) Patent No.: US 12,756,625 B2
(45) Date of Patent: Oct. 6, 2026

(54) PROVISIONING FOR EVENT TRIGGER BASED POLICY AT NEAR-RT RIC ON A1 INTERFACE

(71) Applicant: Parallel Wireless, Inc., Nashua, NH (US)

(72) Inventor: Ketan Parikh, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 306 days.

(21) Appl. No.: 18/301,981

(22) Filed: Apr. 17, 2023

(65) Prior Publication Data

US 2023/0336422 A1 Oct. 19, 2023

Related U.S. Application Data

(60) Provisional application No. 63/331,296, filed on Apr. 15, 2022.

(51) Int. Cl.
*H04L 41/0894* (2022.01)
*H04L 12/14* (2006.01)

(52) U.S. Cl.
CPC ...... *H04L 41/0894* (2022.05); *H04L 12/1407* (2013.01)

(58) Field of Classification Search
CPC . H04L 12/1407; H04L 41/0894; H04L 41/08; H04M 15/62; H04M 15/66
See application file for complete search history.

(56) References Cited

U.S. PATENT DOCUMENTS

| | | | | |
|---|---|---|---|---|
| 11,470,006 | B2 * | 10/2022 | Arora | H04M 15/66 |
| 11,737,122 | B1 * | 8/2023 | Cai | H04W 72/53 370/259 |
| 2014/0011512 | A1 * | 1/2014 | Hu | H04L 43/062 455/452.2 |
| 2020/0329381 | A1 * | 10/2020 | Chou | H04W 24/02 |
| 2021/0235277 | A1 * | 7/2021 | Parekh | H04W 16/14 |
| 2022/0012645 | A1 * | 1/2022 | Ying | G06N 20/20 |
| 2022/0014963 | A1 * | 1/2022 | Yeh | G06N 3/045 |
| 2023/0007538 | A1 * | 1/2023 | Parikh | H04W 8/02 |

(Continued)

OTHER PUBLICATIONS

Polese et al., "Understanding O-RAN: Architecture, Interfaces, Algorithms, Security, and Research Challenges", ARXIV ID: 2202.01032, Feb. 2, 2022, pp. 1-33 (Year: 2022).*

(Continued)

*Primary Examiner* — Jason D Cardone
(74) *Attorney, Agent, or Firm* — Michael Y. Saji; Ashish Patel

(57) ABSTRACT

With the current mechanism there is no way to enforce policy based on events that occur at near-RT RIC and that could provide better control over enforcing certain policies that are meant to come into effect only under certain conditions/event. Accordingly, this disclosure discloses methods and systems for provisioning event-trigger based policies and enforcement thereof at Near-RT-RIC based on policy information sent from non-RT RIC to near-RT RIC. In some embodiments, the near-RT RIC is configured to send a list of event triggers to the non-RT RIC when the non-RT RIC sends a query policy type, and the near-RT RIC is configured to associate a trigger from the list of event triggers with a policy to be enforced at the near-RT RIC.

18 Claims, 4 Drawing Sheets

(56) References Cited

U.S. PATENT DOCUMENTS

| | | | | |
|---|---|---|---|---|
| 2023/0014932 A1* | 1/2023 | Huang | H04W 24/02 | |
| 2023/0110387 A1* | 4/2023 | Urie | H04W 8/186 | 455/418 |
| 2023/0276253 A1* | 8/2023 | Niemelä | H04W 16/22 | 370/329 |
| 2023/0370341 A1* | 11/2023 | Ickin | H04L 41/147 | |
| 2024/0333623 A1* | 10/2024 | Chou | H04L 12/1407 | |
| 2025/0016808 A1* | 1/2025 | Grinshpun | H04W 28/24 | |

OTHER PUBLICATIONS

"O-RAN Working Group 2 A1 interface: Application Protocol 3.0", O-RAN.WG2.A1AP-v0/3.00, Nov. 2020.
"O-RAN Working Group 2 A1 interface: General Aspects and Principles 2.01", O-RAN-WG2.A1GAP-v02.01, Nov. 2020.
"O-RAN Working Group 3 Near-RT RAN Intelligent Controller Near-RT RIC Architecture 1.01", O-RAN.WG3.RICARCH-v01.01, Nov. 2020.
"O-RAN Working Group 3 Near-Real-time RAN Intelligent Controller Architecture & E2 General Aspects and Principles 1.01", O-RAN.WG3.E2GAP-v01.01, Jul. 2020.
"O-RAN Working Group 2 A1 interface: Transport Protocol 1.0", ORAN-WG2.A1.TP-v01.00, Oct. 2019.

* cited by examiner

300

PROVISIONING FOR EVENT TRIGGER BASED POLICY AT NEAR-RT RIC ON A1 INTERFACE

CROSS-REFERENCE TO RELATED APPLICATIONS

This application claims the benefit of priority under 35 U.S.C. § 119(e) to U.S. Provisional Patent Application No. 63/331,296, filed Apr. 15, 2022 and titled "Provision for Event-Trigger Based Policy at Near-RT RIC on A1 Interface," which is also hereby incorporated by reference in its entirety. This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019. This application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This document also hereby incorporates by reference U.S. patent application Ser. Nos. 18/174,580 and 18/183,155 each in its entirety. Features and characteristics of and pertaining to the systems and methods described in the present disclosure, including details of the multi-RAT nodes and the gateway described herein, are provided in the documents incorporated by reference.

In addition, the following specification documents are also incorporated by reference in their entirety: O-RAN A1 interface: Application Protocol 3.0—November 2020 (ORAN.WG2.A1AP-v03.00); O-RAN A1 interface: General Aspects and Principles 2.01—November 2020 (ORAN.WG2.A1GAP-v02.01); O-RAN Near-RT RAN Intelligent Controller Near-RT RIC Architecture 1.01—November 2020 (O-RAN.WG3.RICARCH-v01.01); O-RAN Near-Real-time RAN Intelligent Controller Architecture & E2 General Aspects and Principles 1.01—July 2020 (O-RAN.WG3.E2GAP-v01.01); and O-RAN A1 interface: Transport Protocol 1.0—October 2019 (ORAN-WG2.A1.TP-v01.00).

BACKGROUND

Open RAN is the movement in wireless telecommunications to disaggregate hardware and software and to create open interfaces between them. Open RAN also disaggregates RAN from into components like RRH (Remote Radio Head), DU (Distributed Unit), CU (Centralized Unit), Near-RT (Real-Time) and Non-RT (Real-Time) RIC(RAN Intelligence Controller). Open RAN also disaggregates RAN from into components like RRH (Remote Radio Head), DU (Distributed Unit), CU (Centralized Unit), Near-RT (Real-Time) and Non-RT (Real-Time) RIC (RAN Intelligence Controller). Open RAN has published specifications for the 4G and 5G radio access technologies (RATs).

CU function is split into CU-CP (Control Plane) and CU-UP (User Plane) function to provide Control and User Plane separation. Open RAN solution needs to support: Open Interfaces between different functions; Software based functions; Cloud Native functions; Intelligence support via support for xApps/rApps; 3rd Party RRHs; Disaggregated functions; White Box COTS hardware support; and Data Path separated from Control plane traffic.

0-RAN has an existing mechanism to share policy types between Non-RT-RIC & NEAR RT-RIC on A1 Interface. As per ORAN Specifications, policy types represent the capabilities of the near-RT RIC and as per call-flow defined in specifications, the list of policy types (owned by near-RT RIC) indicating the capabilities of near-RT RIC could be fetched by non-RT RIC by sending an http query. Once the list of policy types identified by policy type Id's are fetched by near-RT RIC, the relevant schemas are identified and used for creation of policies identified by policy Id (owned by non-RT RIC) and the same is enforced at near-RT RIC. The non-RT RIC could provision the policy to be enforced at near-RT RIC over A1 interface. The policy to be enforced would be pre-determined and will be in effect unless the non-RT RIC updates the policy or the existing policy is deleted.

SUMMARY

Figure 1:
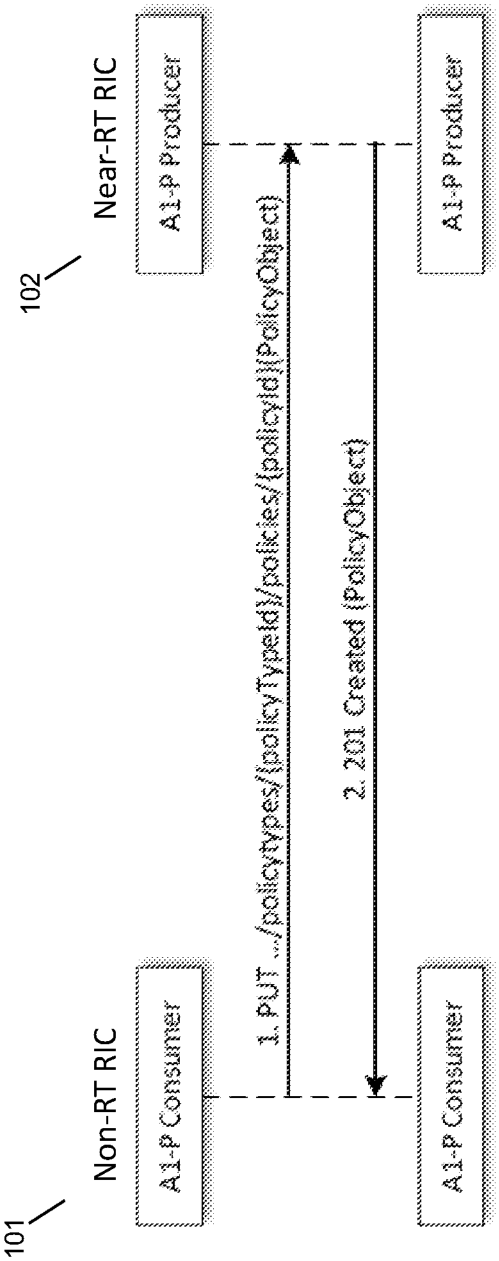
FIG. 1 shows a call flow for policy creation at near-RT RIC, in accordance with some embodiments.

With the current mechanism there is no way to enforce policy based on events that occur at near-RT RIC and that could provide better control over enforcing certain policies that are meant to come into effect only under certain conditions/event. Accordingly, this disclosure discloses methods and systems for provisioning event-trigger based policies and enforcement thereof at Near-RT-RIC based on policy information sent from non-RT RIC to near-RT RIC. In some embodiments, the near-RT RIC is configured to send a list of event triggers to the non-RT MC when the non-RT RIC sends a query policy type, and the near-RT RIC is configured to associate a trigger from the list of event triggers with a policy to be enforced at the near-RT RIC.

DETAILED DESCRIPTION

Abbreviations Used in this Disclosure

CU-CP: This node handles RRC and the control plane part of the PDCP protocol. This node communicates with DU over F1-C interface and with CU-UP over E1 interface as defined in 3GPP specifications.

CU-UP/s: This node handles user plane part of PDCP protocol and SDAP protocol. It communicates with CU-CP over E1 interface and with DU over F1-U interface.

SMO (Service management and orchestration): control of infra structure component like CPU/Memory and scale up and scale down operations.

FCAPS (Fault, Configuration, Security, Performance, Accounting) management of Open-RAN elements (gNB-CU-CP, gNB-CU-UP, gNB-DU)

AMF/SMF: 3GPP defined 5G core network element for control signaling.

UPF: 3GPP defined 5G core network element for data-plane traffic.

DU (gNB-DU): 3GPP defined 5G access network element.

As stated above, with current mechanism there is no way to enforce policy based on events that occur at near-RT RIC and that could provide better control over enforcing certain policies that are meant to come into effect only under certain conditions/event. For e.g., the non-RT RIC could provision certain policies that are only relevant to specific networks like 2G/3G/4G/5G and not all. As well, with current provisioning, once the policy is enforced it will be applicable to all even if it is not intended to unless non-RT RIC re-enforces the new policy or updates the existing one.

Additionally, sometimes the same policy is to be applied with different values for different condition. In this case non-RT RIC needs to provide new values in Policy Update message that will require additional signaling and also the enforcement of new values gets delayed as well. If multiple policies with appropriate values for different conditions/events are sent, then the switching the policy will become easier and more efficient.

The solution to above problem is to send a list of Event Triggers from near-RT RIC to non-RT RIC when non-RT RIC sends query policy type.

Once the list of supported event triggers is received at non-RT RIC, it can associate the "Event-Trigger" with each policy to be enforced in policy message to indicate on which event the particular policy shall be applied to at near-RT RIC.

The list of policies provisioned with event-trigger will help near-RT RIC to switch between the policies and to apply the policy as per condition/event immediately without any need to wait for policies to be provided from non-RT RIC.

This will also help reduce extra signaling between non-RT RIC and near-RT RIC as multiple policies with associated events could be notified and the near-RT RIC can decide when to apply specific policy.

Enforcement may be performed normally at the near-RT RIC, in some embodiments.

In some embodiments the non-RT RIC may also be enabled to turn on and turn off policies and/or turn on and turn off event triggers themselves.

This method thereby provides a way for near RT RIC to inform events-based policy types.

FIG. 1 shows a call flow for policy creation at near-RT RIC. A1-P Consumer is non-RT MC 101 and A1-P Producer is near-RT RIC 102. The policy is sent from A1-P consumer to A1-P Producer with an HTTP PUT command, and an HTTP response 201 is returned by A1-P producer to confirm policy creation.

Figure 2:
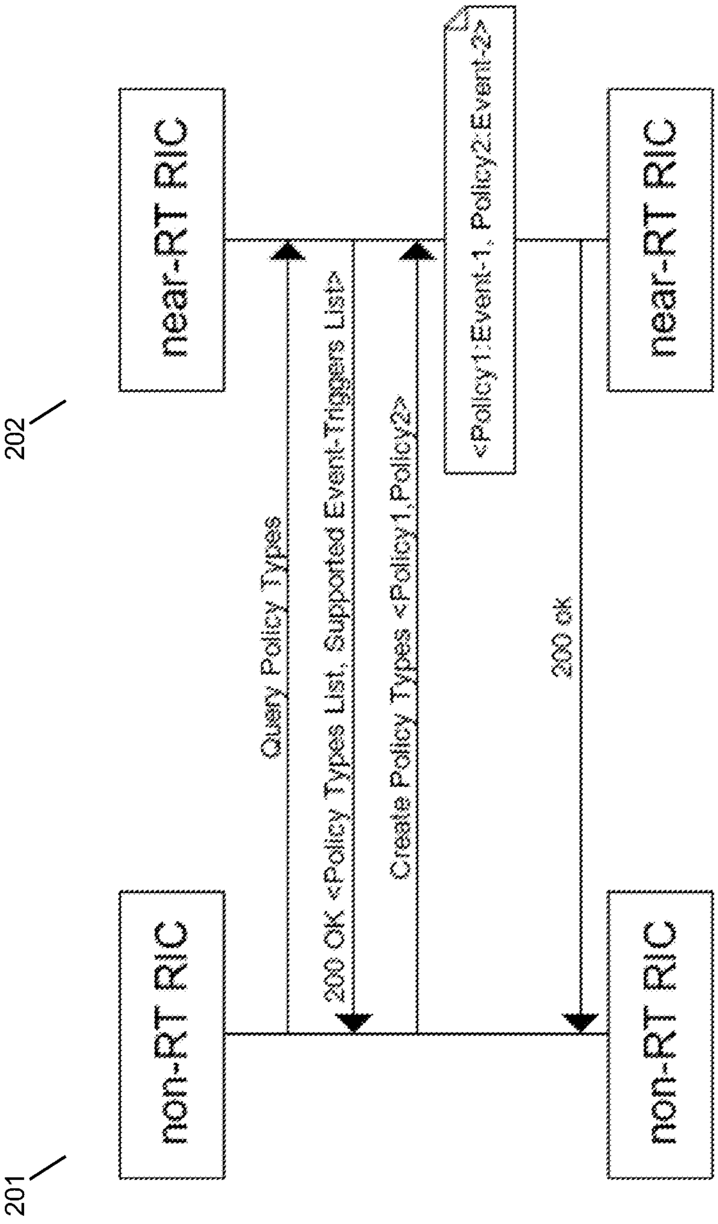
FIG. 2 shows a call flow for policy creation at non-RT RIC, in accordance with some embodiments.

FIG. 2 shows a call flow for policy creation at non-RT RIC, in accordance with some embodiments. A non-RT RIC 201 begins the process by requesting from near-RT RIC 202 what policy types are available. Near-RT RIC responds by listing the policy types and supported event triggers. Non-RT RIC now has the information needed for creation of policy types. These types are stored and provisioned and installed at the near-RT RIC, and, each policy that is stored may be stored in connection with an event trigger, in some embodiments. A confirmation message is sent by the near-RT RIC to confirm policy creation, in some embodiments.

By storing policies with an event trigger, a number of semantics are enabled. The near-RT RIC may be enabled to execute policies using near-real time data from the RAN without consulting the core network or the non-RT RIC, in some embodiments. The near-RT RIC may also be enabled to produce reports of events that have triggers associated with them; log events; and/or indicate to the non-RT RIC that a policy already exists in association with a particular event, in some embodiments. Authentication may be provided in some embodiments to prevent malicious or misconfigured policies from being introduced into the near-RT RIC.

Events may be pre-configured by the operator, in some embodiments. In some embodiments the non-RT RIC may assume a set listing of event triggers and may not require a supported event triggers list. In some embodiments, the non-RT RIC may have logic for determining which event trigger is appropriate to accomplish a given network management goal, for example, reducing connection drops by associating a particular policy with an event trigger that is supported that also relates to a threshold number of connection drops in some way.

Figure 3:
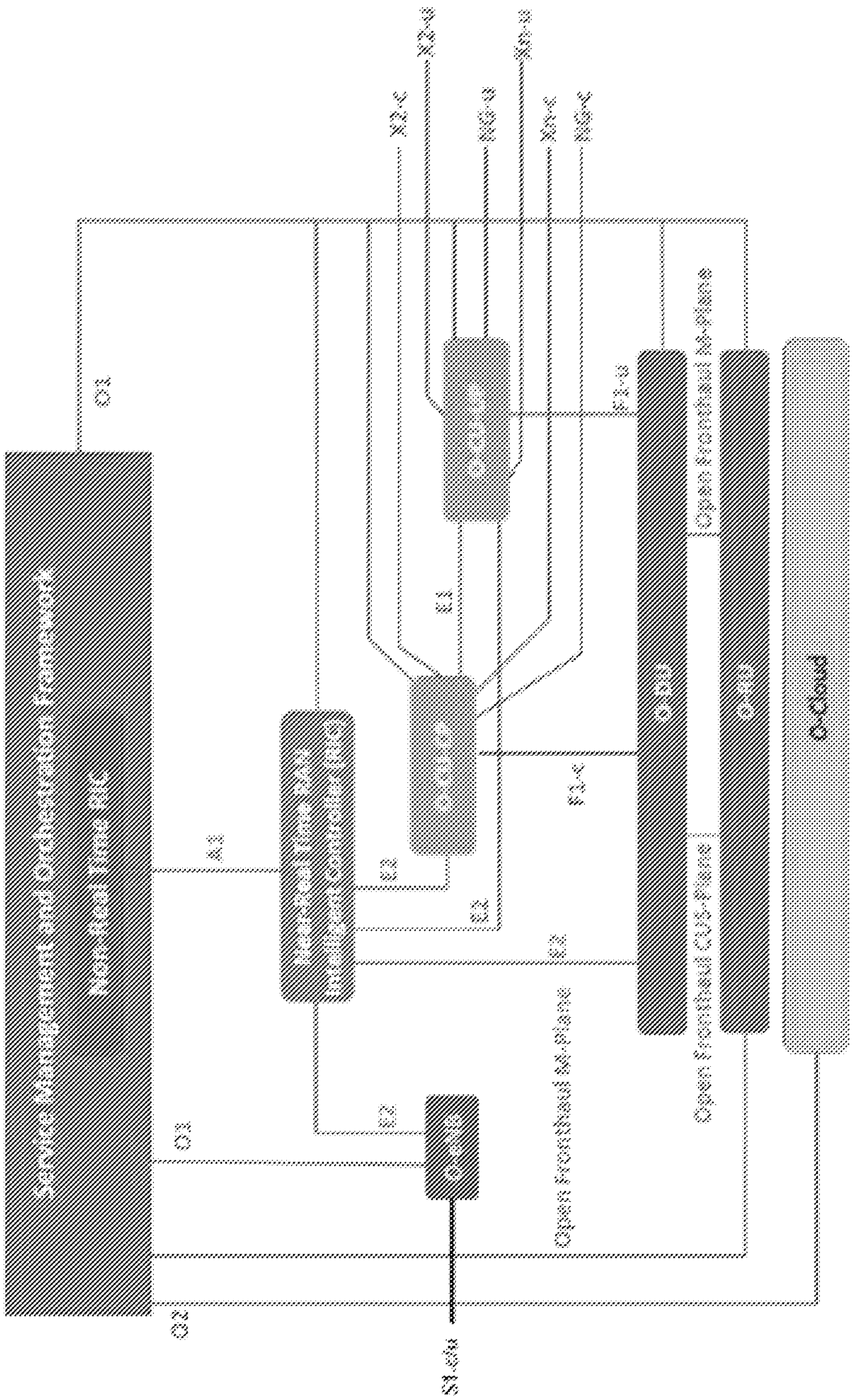
FIG. 3 is a schematic diagram of an OpenRAN core architecture, in accordance with some embodiments.

FIG. 3 is a schematic diagram of an OpenRAN core architecture, in accordance with some embodiments. The present disclosure is enabled for use with the disclosed architecture in this figure. The O-RAN deployment architecture includes an O-DU and O-RU, which together comprise a 5G base station in the diagram as shown. The O-CU-CP (central unit control plane) and O-CU-UP (central unit user plane) are ORAN-aware 5G core network nodes. An ORAN-aware LTE node, O-eNB, is also shown. As well, a near-real time RAN intelligent controller is shown, in communication with the CU-UP, CU-CP, and DU, performing near-real time coordination As well, a non-real time RAN intelligent controller is shown, receiving inputs from throughout the network and specifically from the near-RT RIC and performing service management and orchestration (SMO), in coordination with the operator's network. Various nodes, for example the CU-CP and CU-UP nodes (here marked O-CU-CP and O-CU-UP to denote OpenRAN-compatible nodes), use SCTP and may use the methods and systems described herein for SCTP high availability. In some embodiments, a containerized architecture may be used and may provide the benefits of such an architecture to any of the higher layers and nodes, e.g., O-XXX, Near-RT RIC, etc. of this architecture as shown in the figure, in some embodiments.

Figure 4:
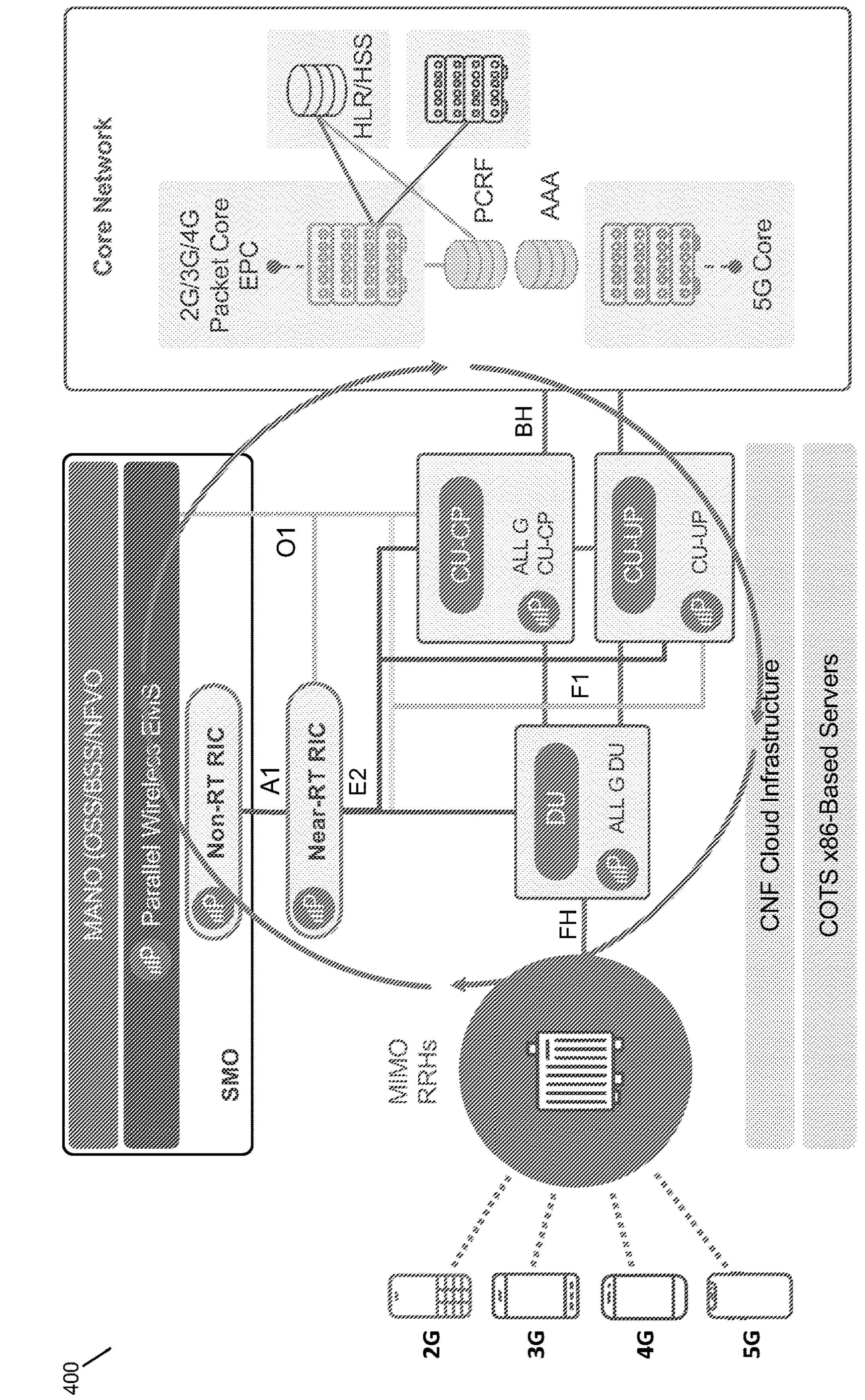
FIG. 4 is a schematic diagram of a multi-RAT RAN deployment architecture, in accordance with some embodiments.

FIG. 4 is a schematic diagram of a multi-RAT RAN deployment architecture, in accordance with some embodiments. Multiple generations of UE are shown, connecting to RRHs that are coupled via fronthaul to an all-G Parallel Wireless DU. The all-G DU is capable of interoperating with an all-G CU-CP and an all-G CU-UP. Backhaul may connect to the operator core network, in some embodiments, which may include a 2G/3G/4G packet core, EPC, HLR/HSS, PCRF, AAA, etc., and/or a 5G core. In some embodiments an all-G near-RT RIC is coupled to the all-G DU and all-G CU-UP and all-G CU-CP. Unlike in the prior art, the near-RT MC is capable of interoperating with not just 5G but also 2G/3G/4G, in some embodiments.

Further Details

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

The protocols described herein have largely been adopted by the 3GPP as a standard for the upcoming 5G network technology as well, in particular for interfacing with 4G/LTE technology. For example, X2 is used in both 4G and 5G and is also complemented by 5G-specific standard protocols called Xn. Additionally, the 5G standard includes two phases, non-standalone (which will coexist with 4G devices and networks) and standalone, and also includes specifications for dual connectivity of UEs to both LTE and NR ("New Radio") 5G radio access networks. The inter-base station protocol between an LTE eNB and a 5G gNB is called Xx. The specifications of the Xn and Xx protocol are understood to be known to those of skill in the art and are hereby incorporated by reference dated as of the priority date of this application.

In some embodiments, an internal controller keeps track of health of some or all pods & micro services in a given namespace. As soon as any pod/container crashes, it updates the remaining pods. And takes necessary steps to bring system in workable state.

In some embodiments, a database (Service registry) may act as service registry database for some or all pods and microservice in given namespace. All the pods on start-up can update required information in database & fetch required information from service registry database.

In some embodiments, the near-RT RIC may be an all-G or multi-RAT near-RT RIC. In other words, the near-RT RIC may perform processing and network adjustments that are appropriate given one or more applicable RATs. For example, a 4G/5G near-RT RIC performs network adjustments that are intended to operate in the 100 ms latency window. However, for 2G or 3G, these windows may be extended. As well, the all-G near-RT RIC can perform configuration changes that takes into account different network conditions across multiple RATs. For example, if 4G is becoming crowded or if compute is becoming unavailable, admission control, load shedding, or UE RAT reselection may be performed to redirect 4G voice users to use 2G instead of 4G, thereby maintaining performance for users. As well, the non-RT RIC is also changed to be a near-RT RIC, such that the all-G non-RT RIC is capable of performing network adjustments and configuration changes for individual RATs or across RATs similar to the all-G near-RT RIC. In some embodiments, each RAT can be supported using processes, that may be deployed in threads, containers, virtual machines, etc., and that are dedicated to that specific RAT, and, multiple RATs may be supported by combining them on a single architecture or (physical or virtual) machine. In some embodiments, the interfaces between different RAT processes may be standardized such that different RATs can be coordinated with each other, which may involve interworking processes or which may involve supporting a subset of available commands for a RAT, in some embodiments.

Although an A1 interface is described, any other appropriate interface may be used to communicate between the near-RT RIC and the non-RT RIC.

Although the above systems and methods for policy provisioning are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to 5G networks, LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A system comprising:

a near-Real Time (RT) Radio Area Network (RAN) Intelligent controller (RIC), including a memory coupled to a processor, in communication with a non-RT RIC, wherein the near-RT RIC is configured to:

send a list of event triggers to the non-RT RIC when the near-RT RIC receives a query policy types message from the non-RT RIC; and associate an event trigger from the list of event triggers with a policy to be enforced at the near-RT RIC based on a create policy types message received from the non-RT RIC.

2. The system of claim 1, wherein the near-RT RIC is further configured to apply the policy at the near-RT RIC when the event trigger occurs.

3. The system of claim 2, wherein apply the policy at the near-RT RIC when the event trigger occurs includes apply the policy at the near-RT RIC when the event trigger occurs without receiving further signaling related to policy types from the non-RT RIC.

4. The system of claim 2, wherein apply the policy at the near-RT RIC when the event trigger occurs includes switch from another applied policy associated with another trigger event.

5. The system of claim 1, wherein associate an event trigger from the list of event triggers with a policy to be enforced at the near-RT RIC based on a create policy types message received from the non-RT RIC includes:

associate a first event trigger from the list of event triggers with a first policy to be enforced at the near-RT RIC based on the create policy types message received from the non-RT RIC; and associate a second event trigger from the list of event triggers with a second policy to be enforced at the near-RT RIC based on the create policy types message received from the non-RT RIC.

6. The system of claim 1, wherein the non-RT RIC associates a first event trigger from the list of event triggers with a first policy to be enforced by the near-RT RIC in the create policy types message received from the non-RT RIC, and associates a second event trigger from the list of event triggers with a second policy to be enforced by the near-RT RIC in the create policy types message.

7. A method of provisioning a policy by a near-Real Time (RT) Radio Area Network (RAN) Intelligent controller (RIC) based on an event trigger, comprising:

sending a list of event triggers to a non-RT RIC in communication with the near-RT RIC when the near-RT RIC receives a query policy types message from the non-RT RIC; and associating an event trigger from the list of event triggers with a policy to be enforced at the near-RT RIC based on a create policy types message received from the non-RT RIC.

8. The method of claim 7, further comprising applying the policy at the near-RT RIC when the event trigger occurs.

9. The method of claim 8, wherein applying the policy at the near-RT RIC when the event trigger occurs includes applying the policy at the near-RT RIC when the event trigger occurs without receiving further signaling related to policy types from the non-RT RIC.

10. The method of claim 8, wherein applying the policy at the near-RT RIC when the event trigger occurs includes switching from another applied policy associated with another trigger event.

11. The method of claim 7, wherein associating an event trigger from the list of event triggers with a policy to be enforced at the near-RT RIC based on a create policy types message received from the non-RT RIC includes:

associating a first event trigger from the list of event triggers with a first policy to be enforced at the near-RT RIC based on the create policy types message received from the non-RT RIC; and associating a second event trigger from the list of event triggers with a second policy to be enforced at the near-RT RIC based on the create policy types message received from the non-RT RIC.

12. The method of claim 7, wherein the non-RT RIC associates a first event trigger from the list of event triggers with a first policy to be enforced by the near-RT RIC in the create policy types message received from the non-RT RIC, and associates a second event trigger from the list of event triggers with a second policy to be enforced by the near-RT RIC in the create policy types message.

13. A non-transitory computer-readable medium containing instructions for provisioning a policy by a near-Real Time (RT) Radio Area Network (RAN) Intelligent controller (RIC) based on an event trigger, which when executed, cause a system to perform steps comprising:

sending a list of event triggers to a non-RT RIC in communication with the near-RT RIC when the near-RT RIC receives a query policy types message from the non-RT RIC; and associating an event trigger from the list of event triggers with a policy to be enforced at the near-RT RIC based on a create policy types message received from the non-RT RIC.

14. The non-transitory computer-readable medium of claim 13, further comprising instructions, which when executed, cause the system to further perform the step comprising applying the policy at the near-RT RIC when the event trigger occurs.

15. The non-transitory computer-readable medium of claim 14, wherein applying the policy at the near-RT RIC when the event trigger occurs includes applying the policy at the near-RT RIC when the event trigger occurs without receiving further signaling related to policy types from the non-RT RIC.

16. The non-transitory computer-readable medium of claim 14, wherein applying the policy at the near-RT RIC when the event trigger occurs includes switching from another applied policy associated with another trigger event.

17. The non-transitory computer-readable medium of claim 13, wherein associating an event trigger from the list of event triggers with a policy to be enforced at the near-RT RIC based on a create policy types message received from the non-RT RIC includes:

associating a first event trigger from the list of event triggers with a first policy to be enforced at the near-RT RIC based on the create policy types message received from the non-RT RIC; and associating a second event trigger from the list of event triggers with a second policy to be enforced at the near-RT RIC based on the create policy types message received from the non-RT RIC.

18. The non-transitory computer-readable medium of 13, wherein the non-RT RIC associates a first event trigger from the list of event triggers with a first policy to be enforced by the near-RT RIC in the create policy types message received from the non-RT RIC, and associates a second event trigger from the list of event triggers with a second policy to be enforced by the near-RT RIC in the create policy types message.

* * * * *